US012613736B2

(12) United States Patent
Raz et al.

(10) Patent No.: US 12,613,736 B2
(45) Date of Patent: Apr. 28, 2026

(54) MEMORY AWARE CONTEXT SWITCHING

(71) Applicant: Next Silicon Ltd, Givatayim (IL)

(72) Inventors: Elad Raz, Ramat Gan (IL); Ilan Tayari, Tzur Hadassa, IL (US)

(73) Assignee: Next Silicon Ltd, Givatayim (IL)

( * ) Notice: Subject to any disclaimer, the term of this patent is extended or adjusted under 35 U.S.C. 154(b) by 781 days.

(21) Appl. No.: 17/872,059

(22) Filed: Jul. 25, 2022

(65) Prior Publication Data

US 2024/0028389 A1      Jan. 25, 2024

(51) Int. Cl.
*G06F 9/46* (2006.01)
*G06F 9/48* (2006.01)
*G06F 11/34* (2006.01)

(52) U.S. Cl.
CPC ........ *G06F 9/4856* (2013.01); *G06F 11/3495* (2013.01)

(58) Field of Classification Search
CPC .................................................... G06F 9/4856
USPC ........................................................ 718/108
See application file for complete search history.

(56) References Cited

U.S. PATENT DOCUMENTS 7,103,812 B1 * 9/2006 Thompson ............ G06F 11/261
714/724
9,910,768 B1 * 3/2018 Melekhova ........... G06F 9/5016

2010/0037025 A1 * 2/2010 Zheltov ............... G06F 11/3636
711/128
2011/0247000 A1 * 10/2011 Eidus ........................ G06F 9/50
718/107
2012/0198187 A1 * 8/2012 Accapadi ............. G06F 9/5016
711/E12.071

(Continued)

FOREIGN PATENT DOCUMENTS

GB           2524085          9/2015
KR    10-2016-0132437         11/2016
(Continued)

OTHER PUBLICATIONS

Grounds of Reason of Rejection Dated Dec. 4, 2024 Feb. 2015 From the Korean Intellectual Property Office Re. Application No. 10-2023-0096891 and its Machine Translation into English. (19 Pages).

(Continued)

*Primary Examiner* — Mehran Kamran

(57) ABSTRACT

A system for executing a plurality of software threads, comprising: a plurality of processing circuitries; a plurality of memory areas connected to the processing circuitries, each memory area associated with at least one of the processing circuitries; and at least one hardware processor, connected to the processing circuitries and configured for: in each of a plurality of iterations: while the processing circuitries execute the software threads, collecting for each thread a plurality of thread statistical values indicative of a plurality of memory accesses to at least some of the memory areas performed when executing the thread; for at least one thread, performing an analysis comprising the thread statistical values thereof to identify a preferred memory area of the plurality of memory areas; and configuring one of the at least one processing circuitry associated with the preferred memory area to execute the at least one thread.

23 Claims, 4 Drawing Sheets

(56) References Cited

U.S. PATENT DOCUMENTS

| | | | | |
|---|---|---|---|---|
| 2012/0200579 | A1* | 8/2012 | Hartog | G06F 9/4881 |
| | | | | 345/503 |
| 2012/0272016 | A1* | 10/2012 | Bello | G06F 9/5077 |
| | | | | 711/E12.001 |
| 2015/0121038 | A1* | 4/2015 | Dasika | G06F 9/3455 |
| | | | | 712/207 |
| 2015/0248361 | A1* | 9/2015 | van Riel | G06F 12/0284 |
| | | | | 711/148 |
| 2016/0203025 | A1* | 7/2016 | Yao | G06F 9/5038 |
| | | | | 718/104 |
| 2017/0109080 | A1* | 4/2017 | Liu | G06F 12/109 |
| 2017/0228259 | A1* | 8/2017 | Solihin | G06F 9/5033 |
| 2017/0286421 | A1* | 10/2017 | Hayenga | G06F 21/75 |
| 2018/0081555 | A1* | 3/2018 | Noguchi | G06F 3/0631 |
| 2018/0189206 | A1* | 7/2018 | Lee | G06F 13/28 |
| 2018/0341598 | A1* | 11/2018 | Patel | G06F 9/45558 |
| 2019/0235985 | A1* | 8/2019 | Idicula | G06F 11/3457 |
| 2019/0243570 | A1* | 8/2019 | Mittal | G06F 3/0649 |
| 2019/0324757 | A1* | 10/2019 | Valerio | G06F 9/3867 |
| 2020/0125411 | A1* | 4/2020 | Goodman | G06F 9/505 |
| 2021/0326171 | A1* | 10/2021 | Riesen | G06F 9/4856 |
| 2023/0195619 | A1* | 6/2023 | Shechter | G06F 12/0607 |
| | | | | 711/127 |
| 2023/0245709 | A1* | 8/2023 | Samuel | G06F 11/2094 |
| | | | | 714/723 |
| 2023/0273879 | A1* | 8/2023 | Bordelon | G06F 12/0646 |
| | | | | 711/202 |
| 2024/0028389 | A1* | 1/2024 | Raz | G06F 11/3495 |

FOREIGN PATENT DOCUMENTS

| | | |
|---|---|---|
| KR | 10-2020-0108362 | 9/2020 |
| WO | WO 2014/000274 | 1/2014 |
| WO | WO 2015/130291 | 9/2015 |

OTHER PUBLICATIONS

Supplementary European Search Report and the European Search Opinion Dated Oct. 19, 2023 From the European Patent Office Re. Application No. 23187400.9. (7 Pages).

* cited by examiner

200

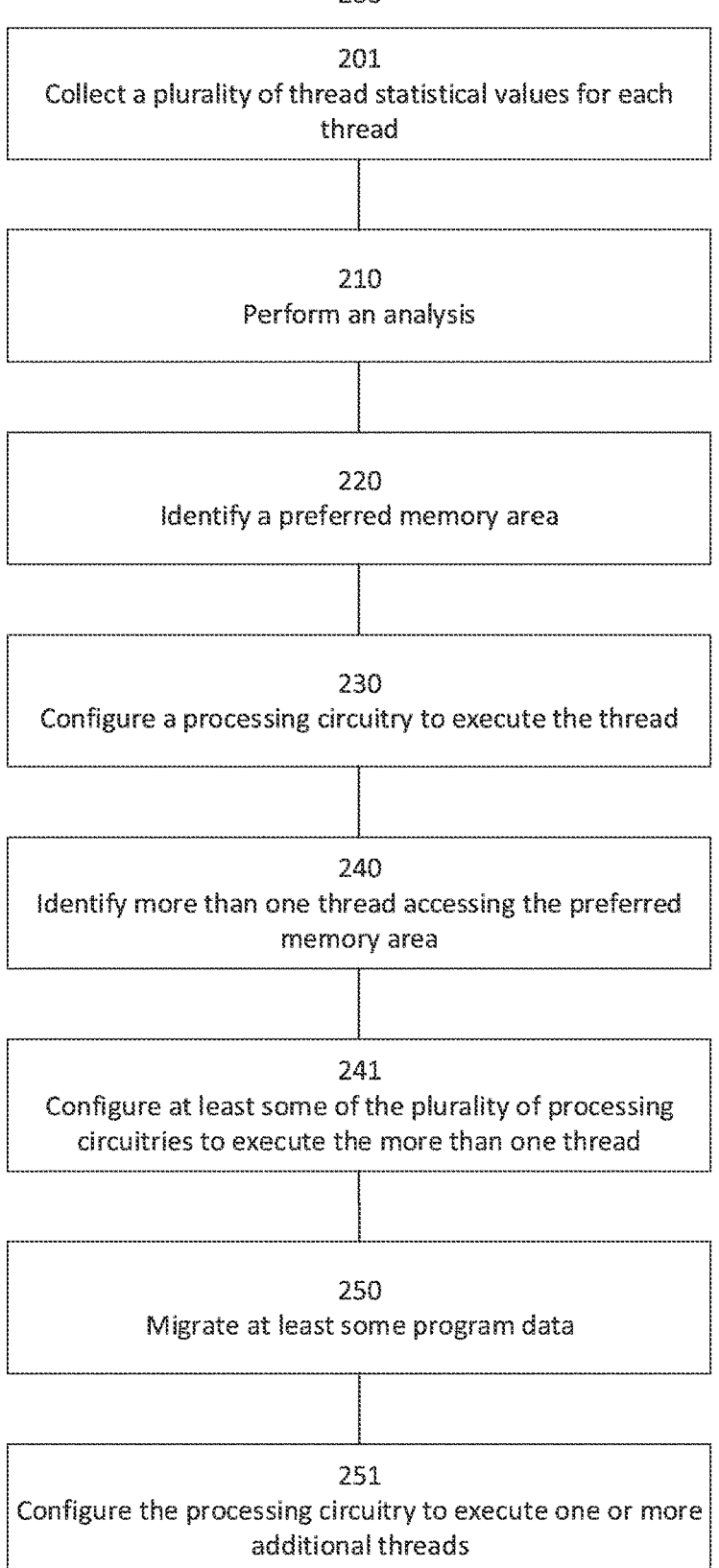

201
Collect a plurality of thread statistical values for each thread

210
Perform an analysis

220
Identify a preferred memory area

230
Configure a processing circuitry to execute the thread

240
Identify more than one thread accessing the preferred memory area

241
Configure at least some of the plurality of processing circuitries to execute the more than one thread 250
Migrate at least some program data 251
Configure the processing circuitry to execute one or more additional threads

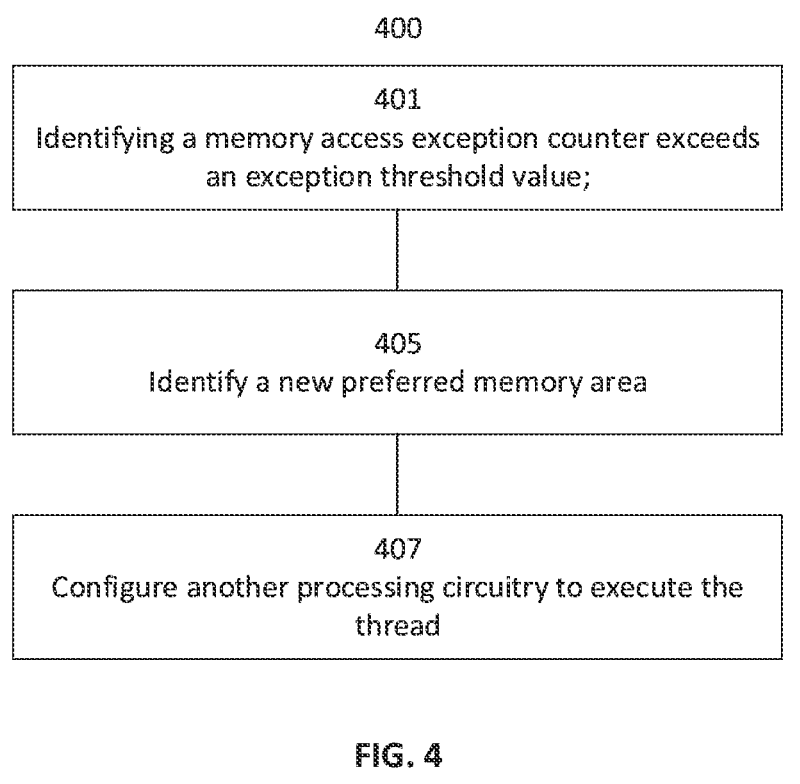

```
┌─────────────────────────────────────────────────┐
│                      401                          │
│   Identifying a memory access exception counter   │
│          exceeds an exception threshold value;    │
└─────────────────────────────────────────────────┘
                        │
┌─────────────────────────────────────────────────┐
│                      405                          │
│          Identify a new preferred memory area     │
└─────────────────────────────────────────────────┘
                        │
┌─────────────────────────────────────────────────┐
│                      407                          │
│   Configure another processing circuitry to       │
│              execute the thread                    │
└─────────────────────────────────────────────────┘
```

FIG. 4

MEMORY AWARE CONTEXT SWITCHING

FIELD AND BACKGROUND OF THE INVENTION

Some embodiments described in the present disclosure relate to a computerized system and, more specifically, but not exclusively, to runtime configuration of a computerized system.

For brevity, unless otherwise noted henceforth the term system is used to mean a computerized system and the terms are used interchangeably.

There is a continuous increase in the need to improve performance of computerized systems, for example by increasing the amount of tasks performed by the system in a time interval, also known as throughput. Another metric that may be used to measure a system's performance is the system's latency, i.e. the amount of time a task is delayed before it is performed or before the task is completed. A system's performance may be increased by increasing the system's throughput and additionally or alternatively reducing the system's latency.

In computer programming, a software thread is a unit of execution that can be managed by a scheduler. Typically, a software thread is a sequence of computer instructions that can be executed independently of other computer instructions. For example, a software thread may be a sequence of computer instructions of a software program that can be executed independently of other computer instructions of the software program that are executed in another software thread.

For brevity, henceforth the term thread is used to mean "software thread" and the terms are used interchangeably.

To increase a system's performance, some systems comprise more than one processing circuitry, allowing simultaneous execution of more than one thread. Thus, when such a system executes a plurality of threads, the threads may be distributed between a plurality of processing circuitries of the system.

Some systems comprising a plurality of processing circuitries additionally comprise a plurality of memory areas. In computer design, the term Non-Uniform Memory Access (NUMA) refers to a computer design paradigm where a first access time from a processing circuitry, of one or more processing circuitries, to a first memory area of one or more memory areas, is different from a second access time of the processing circuitry to a second memory area of the one or more memory areas. In some systems, the difference between the first access time and the second access time depends on a physical location of the first memory area in relation to the processing circuitry. In some systems, the difference between the first access time and the second access time depends on memory access metrics of the first memory area and the second memory area. In some such systems, each of the plurality of memory areas is associated with one or more of the plurality of processing circuitries, for example by being electrically coupled to the one or more processing circuitries. A memory area may be associated with a processing circuitry according to one or more other topological criteria, for example a physical distance between the memory area and the processing circuitry. Additionally, or alternatively, a memory area may be associated with a processing circuitry according to one or more memory access metrics, for example according to the latency of a memory access from the processing circuitry to the memory area. Other examples of a memory access metric include memory bandwidth (transfer rate), and memory module timing parameters such as memory clock frequency and row address to column address delay.

SUMMARY OF THE INVENTION

It is an object of some embodiments described in the present disclosure to provide a system and a method for executing a plurality of threads. In such embodiments, a plurality of statistical values indicative of a plurality of memory accesses to one or more of a plurality of memory areas of the system, and collected while a plurality of processing circuitries of the system executes a plurality of threads, are analyzed to identify for one or more of the plurality of threads a preferred memory area of the plurality of memory areas, and one or more processing circuitries of the plurality of circuitries that are associated with the preferred memory area are configured to execute the one or more threads. Configuring the one or more processing circuitries that are associated with the preferred memory area to execute the one or more threads increases performance of a plurality of additional memory accesses, for example reducing total latency of the plurality of additional memory accesses, and additionally or alternatively increasing total bandwidth of the plurality of additional memory accesses, thus increasing performance of the system when executing the plurality of threads. Additionally, or alternatively, increasing performance of the plurality of additional memory accesses comprises distributing a demand for a cache to increase cache utilization, for example in accordance with a cache usage policy.

The foregoing and other objects are achieved by the features of the independent claims. Further implementation forms are apparent from the dependent claims, the description and the figures.

According to a first aspect, a system for executing a plurality of software threads comprises: a plurality of processing circuitries; a plurality of memory areas connected to the plurality of processing circuitries, each memory area associated with at least one of the plurality of processing circuitries; and at least one hardware processor, connected to the plurality of processing circuitries and configured for: in each of a plurality of iterations: while the plurality of processing circuitries executes the plurality of software threads, collecting, for each software thread of one or more of the plurality of software threads, a plurality of thread statistical values indicative of a plurality of memory accesses to at least some of the plurality of memory areas performed when executing the software thread; for at least one software thread of the one or more software threads, performing an analysis comprising the plurality of thread statistical values thereof to identify a preferred memory area of the plurality of memory areas; and configuring one of the at least one processing circuitry associated with the preferred memory area to execute the at least one software thread.

According to a second aspect, a method for executing a plurality of software threads comprises: in each of a plurality of iterations: while a plurality of processing circuitries executes the plurality of software threads, collecting for each software thread of one or more of the plurality of software threads a plurality of thread statistical values indicative of a plurality of memory accesses to at least some of a plurality of memory areas performed when executing the software thread, where the plurality of memory areas are connected to the plurality of processing circuitries, each memory area associated with at least one of the plurality of processing circuitries; for at least one software thread of the one or more software threads, performing an analysis comprising the plurality of thread statistical values thereof to identify a preferred memory area of the plurality of memory areas; and configuring one of the at least one processing circuitry associated with the preferred memory area to execute the at least one software thread.

According to a third aspect, a software program product for executing a plurality of software threads comprises: a non-transitory computer readable storage medium; program instructions for in each of a plurality of iterations: while a plurality of processing circuitries executes the plurality of software threads, collecting for each software thread of one or more of the plurality of software threads a plurality of thread statistical values indicative of a plurality of memory accesses to at least some of a plurality of memory areas performed when executing the software thread, where the plurality of memory areas are connected to the plurality of processing circuitries, each memory area associated with at least one of the plurality of processing circuitries; for at least one software thread of the one or more software threads, performing an analysis comprising the plurality of thread statistical values thereof to identify a preferred memory area of the plurality of memory areas; and configuring one of the at least one processing circuitry associated with the preferred memory area to execute the at least one software thread; wherein the program instructions are executed by at least one computerized processor from the non-transitory computer readable storage medium.

With reference to the first and second aspects, in a first possible implementation of the first and second aspects the plurality of processing circuitries comprises at least one of: a central processing unit (CPU), a core of a multi-core processing unit (CPU core), a data processing unit (DPU), a graphics processing unit (GPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), a quantum computer, a reconfigurable interconnected computing grid, comprising a plurality of reconfigurable logical elements connected by a plurality of reconfigurable data routing junctions, and part of a reconfigurable interconnected computing grid. Optionally, at least one of the plurality of processing circuitries is integrated into the at least one hardware processor.

With reference to the first and second aspects, in a second possible implementation of the first and second aspects the plurality of memory areas comprises at least one of: a memory component electrically coupled with at least one of the plurality of processing circuitries; a cache memory of another memory component connected to at least one other of the plurality of processing circuitries, where the cache memory is electrically coupled with the at least one other processing circuitry; yet another memory component connected to at least one other of the processing circuitries via a bus or at least one digital communication network interface; and at least part of a reconfigurable interconnected memory grid that is part of a reconfigurable interconnected computing grid. Optionally, each of the plurality of memory areas is associated with the at least one of the plurality of processing circuitries according to at least one memory access metric. Optionally, the at least one memory metric comprises at least one of the group of memory metrics consisting of: access latency, throughput, a cache utilization metric, memory capacity, topological distance, memory allocation ownership, and memory coherence. Associating a memory area with a processing circuitry according to a memory access metric facilitates increasing performance of a plurality of memory accesses when executing a software thread that accesses a preferred memory area by executing the software thread by a processing circuitry associated with the preferred memory area.

With reference to the first and second aspects, in a third possible implementation of the first and second aspects performing the analysis comprising the plurality of thread statistical values of the at least one software thread further comprises using a plurality of control-flow statistical values collected while executing the plurality of software threads. Optionally, performing the analysis comprising the plurality of thread statistical values of the at least one software thread further comprises using at least one state value of the at least one software thread collected while executing the plurality of software threads. Using a plurality of control-flow statistical values, and additionally or alternatively one or more state values, collected while executing the plurality of software threads increases accuracy of identifying the preferred memory area compared to identifying the preferred memory area based only on memory addresses, and thus increases improvement to performance of the system by executing the one or more software threads on a processing circuitry associated with the preferred memory area, for example by reducing an amount of latency of a plurality of memory accesses performed by the one or more software threads to the preferred memory area and additionally or alternatively by increasing throughput of the plurality of memory accesses. Optionally, the plurality of thread statistical values comprises at least one of: a latency of a memory access, a throughput of a memory area, an amount of memory accesses to a memory area, an amount of memory accesses to a memory area by a thread of the plurality of software threads, an amount of memory accesses to a memory area by a subset of the plurality of software threads, an amount of cache misses, and an amount of translation lookaside buffer misses. Optionally, the at least one software thread comprises a plurality of telemetry computer instructions for the purpose of collecting the plurality of thread statistical values. Optionally, at least one of the plurality of processing circuitries comprises telemetry circuitry for the purpose of collecting the plurality of thread statistical values. Collecting the plurality of thread statistical values using a plurality of telemetry computer instructions and additionally or alternatively by telemetry circuitry increases accuracy of the plurality of thread statistical values compared to statistical values collected by external monitoring of the plurality of memory accesses, thus increasing accuracy of identifying the preferred memory area. In addition, using telemetry circuitry in a processing circuitry allows collecting the plurality of thread statistical values without impacting execution time of the one or more software threads.

With reference to the first and second aspects, in a fourth possible implementation of the first and second aspects performing the analysis comprising the plurality of thread statistical values of the at least one software thread further comprises using at least one other plurality of thread statistical values of at least one other thread of the one or more software threads. Using at least one other plurality of thread statistical values of one or more other threads increases accuracy of identifying the preferred memory area, for example by identifying that the one or more other threads do not access the preferred memory area.

With reference to the first and second aspects, in a fifth possible implementation of the first and second aspects the preferred memory area contains program data used by the at least one software thread. Optionally, performing the analysis comprising the plurality of thread statistical values of the at least one software thread further comprises identifying that the preferred memory area contains program data used by the at least one software thread. Identifying that the preferred memory area contains program data used by the at least one software thread increases accuracy of identification of the preferred memory area. Optionally, the at least one hardware processor is further configured for: identifying more than one software thread of the plurality of software threads accessing the preferred memory area; and configuring at least some of the at least one processing circuitry associated with the preferred memory areas to execute the more than one software thread. Configuring one or more processing circuitries associated with the preferred memory area to execute more than one thread that access the preferred memory area increases improvement to performance of a plurality of memory accesses to the preferred memory are by the more than one software thread. Optionally, the at least one hardware processor is further configured for migrating at least some application data from one memory area of the plurality of memory areas to another memory area of the plurality of memory areas in response to performing the analysis. Migrating application data from one memory area to another memory area further increases improvement to the performance of a plurality of memory accesses, for example by copying all application data used by the at least one software thread to the preferred memory area, or by copying data not used by the software thread to another memory area not accessed by the at least one software thread. Optionally, the at least some application data is accessed by at least one additional thread of the plurality of software threads. Optionally, the other memory area is the preferred memory area. Optionally, the at least one hardware processor is further configured for configuring the at least one processing circuitry associated with the preferred memory area to execute the at least one additional thread. Configuring one or more processing circuitries associated with the preferred memory area to execute more than one thread that access the at least some application data increases improvement to performance of a plurality of memory accesses to the preferred memory are by the more than one software thread.

With reference to the first and second aspects, in a sixth possible implementation of the first and second aspects the plurality of software threads each execute part of a compute kernel of a software program, where the compute kernel comprises a plurality of loop iterations for accessing application data of the software program such that each of the plurality of software threads executes some of the plurality of loop iterations, accessing at least some of the application data thereby. Optionally, the at least one hardware processor is further configured for identifying the preferred memory area by additionally or alternatively performing another analysis of a code of the plurality of software threads to identify the compute kernel and additionally or alternatively to identify the application data. Identifying the preferred memory area by identifying the compute kernel and additionally or alternatively identifying the application data increases accuracy of identifying the preferred memory area, for example by identifying for each loop iteration of the plurality of loop iterations the respective application data accesses thereby. Optionally, performing the analysis is after executing an instruction immediately preceding the compute kernel and before executing a first instruction of the compute kernel. Performing the analysis in runtime immediately before executing the first instruction of the compute kernel increases accuracy of identifying the preferred memory area.

With reference to the first and second aspects, in a seventh possible implementation of the first and second aspects the at least one hardware processor is further configured for: accessing a plurality of memory access exception counters, each associated with at least one additional software thread of the plurality of software threads and indicative of an amount of memory exceptions when executing the additional software thread associated therewith; and performing the analysis further comprising using the plurality of memory access exception counters. Optionally, the at least one hardware processor configures the one of the at least one processing circuitry associated with the preferred memory area in an identified iteration of the plurality of iterations. Optionally, the at least one hardware processor is further configured for, in another iteration of the plurality of iterations executed after the identified iteration: identifying for the at least one software thread that the memory access exception counter associated therewith exceeds an exception threshold value; identifying a new preferred memory area of the plurality of memory areas; and configuring one of the at least one processing circuitry associated with the other preferred memory area to execute the at least one software thread. Using a plurality of memory access exception counters increases accuracy of identifying the preferred memory area. Identifying a new preferred memory area according to a memory access exception counter, in another of the plurality of iterations after the identified iteration, facilitates further increasing performance of a plurality of additional memory accesses by the at least one thread.

With reference to the first and second aspects, in an eighth possible implementation of the first and second aspects the at least one hardware processor is further configured for: generating for a first processing circuitry of the plurality of processing circuitries a first page table for mapping at least a first subset of the plurality of memory areas according to a first set of memory attributes; and generating for a second processing circuitry of the plurality of processing circuitries a second page table for mapping at least a second subset of the plurality of memory areas according to a second set of memory attributes. Optionally, at least a first statistical value of the plurality of thread statistical values is collected according to at least one exception when accessing the first page table, and at least a second statistical value of the plurality of thread statistical values is collected according to at least one other exception when accessing the second page table. Using separate page tables for different types of accesses, each type characterized by a set of memory attributes, facilitates collecting statistics separately for accesses associated with each set of memory attributes, thus increasing accuracy of identifying the preferred memory area. Optionally, the first processing circuitry is the second processing circuitry. Having two or more page tables for one processing circuitry allows collecting separate statistical values for each of the first and second set of memory access attributes for the one processing circuitry, increasing accuracy of identifying the preferred memory area.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIG. 2 is a flowchart schematically representing an optional flow of operations, according to some embodiments;

FIG. 4 is a flowchart schematically representing an optional flow of operations for analysis using exception counters, according to some embodiments.

DESCRIPTION OF SPECIFIC EMBODIMENTS OF THE INVENTION

Figure 1:
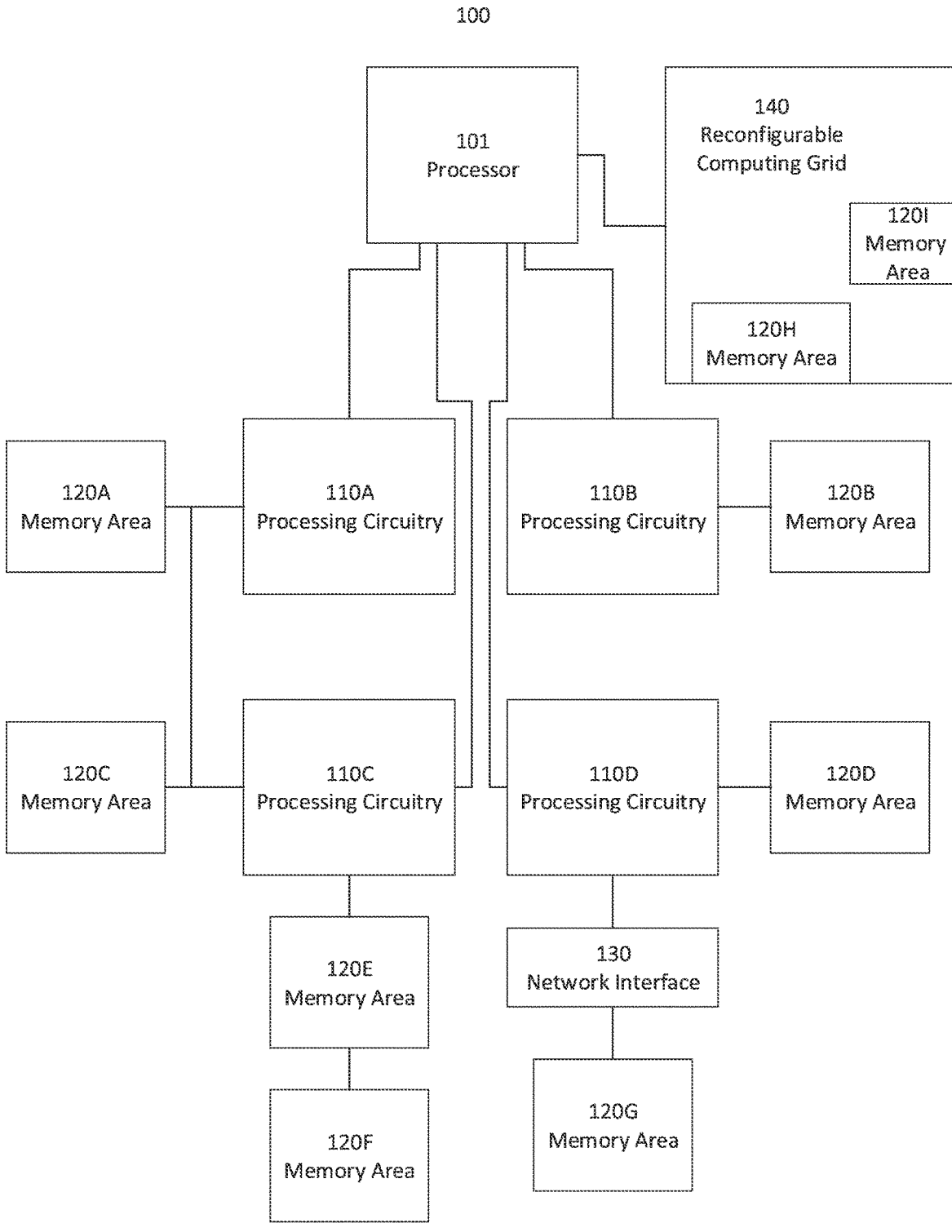
FIG. 1 is a schematic block diagram of an exemplary system, according to some embodiments.

Accessing a memory area of the plurality of memory areas may be more efficient when executed by a first of the plurality of processing circuitries than when executed by a second of the plurality of processing circuitries. For example, latency of accessing the memory area from the first processing circuitry may be shorter than when accessing the memory area from the second processing circuitry, for example in a NUMA system. Thus, distribution of the plurality of threads between the plurality of processing circuitries impacts the performance of the system's memory. As the system's performance is impacted by the performance of the system's memory, distribution of the plurality of threads between the plurality of processing circuitries impacts the system's performance.

According to some common practices, distribution of a plurality of threads between a plurality of processing circuitries of a system is according to processing circuitry availability. According to some existing practices, when the system executes the plurality of software threads an operating system executed by the system assigns each thread to one of a plurality of processing circuitries according to a load-balancing scheduling policy, for example using a round-robin scheduling method or according to one or more load-balancing metrics, for example processing circuitry utilization. In such systems assignment is performed for each thread when the thread starts executing, either initially or after being suspended. In some systems the operating system occasionally redistributes the executing threads between the plurality of processing circuitries to improve the balance between the plurality of processing circuitries. According to such common practices, a software thread is not tied to a processing circuitry and may migrate between the plurality of processing circuitries. In some systems, when a software thread is migrated from one processing circuitry to another processing circuitry, some program data of the thread is copied from one memory area, associated with the one processing circuitry, to another memory area associated with the other processing circuitry, for example when a thread is migrated between a central processing unit (CPU) and a graphics processing unit (GPU). Such memory migration overhead may have a negative impact on the system's performance.

Thread migration between the plurality of processing circuitries according to metrics of processing load might impact the performance of the system's memory. For example, total latency of a plurality of memory accesses may increase when a thread executed by a first processing circuitry that accesses a memory area associated with the first processing circuitry is assigned to execute on a second processing circuitry having longer latency when accessing the memory area compared to latency when accessing the memory area from the first processing circuitry. In the field of computers, the term "thread affinity", or "affinity", refers to associating a thread with a processing core, for example as a means of optimizing a system's performance. Performance of the system's memory may be improved by creating an affinity between a thread and a processing circuitry according to memory used by the thread. Similarly, performance of the system's memory may be improved by assigning more than one thread that access an identified memory area to one or more common processing circuitries, for example such that the more than one thread share a cache memory that caches the memory area.

There exist methods for a programmer to indicate, in source code of a software program, a preferred assignment of one or more threads of the software program to one or more processing circuitries. However, such indications in the source code require a programmer to have a-priori knowledge regarding an expected topology of the system that executes the software program. Performance improvements gained by such indications may be reduced when executing the software program on a system that does not have the expected topology. In addition, such indications are typically static and do not accommodate changes in memory access patterns of a thread. In addition, in some complex computations, for example large scale computations that are broken up among a plurality of threads, each thread may be assigned a random memory location, for example when a thread is assigned a task not when the thread is initiated but rather during runtime, for example by retrieving a task from a pool of tasks. In such an example it may not be possible for the programmer to know in advance which memory is assigned to each thread and additionally or alternatively not be possible to predict the memory access pattern of each thread and thus the programmer may not be able to determine a preferred assignment, let alone indicate the preferred assignment, of the one or more threads to the one or more processing circuitries.

The present disclosure, in some embodiments described herewithin, proposes collecting for each thread of one or more of the plurality of threads a plurality of thread statistical values while the plurality of processing circuitries execute the plurality of threads, where the plurality of statistical values is indicative of a plurality of memory accesses to at least some of a plurality of memory areas connected to the plurality of processing circuitries and where the plurality of memory accesses are performed when executing the thread. Some examples of a thread statistical value are a latency of a memory access, a throughput of a memory area, an amount of memory accesses to a memory area, an amount of cache memory usage, and an amount of accesses to a memory area by the thread. Optionally, the thread comprises a plurality of telemetry computer instructions for the purpose of collecting the plurality of statistical values. Optionally, one or more of the plurality of processing circuitries comprise telemetry circuitry for the purpose of collecting the plurality of statistical values. Further in such embodiments, the present disclosure proposes performing for at least one of the plurality of threads an analysis, comprising the plurality of thread statistical values of the thread, to identify a preferred memory area of the plurality of memory areas. For example, a preferred memory area may be a memory area most frequently accessed by the thread according to the plurality of thread statistical values. In another example, the preferred memory area is a memory area having the greatest total bandwidth, according to the plurality of thread statistics. Optionally, the preferred memory area contains program data used by the thread. Further in such embodiments, the present disclosure proposes configuring one of one or more processing circuitries associated with the preferred memory area to execute the thread. Optionally, collecting the plurality of thread statistical values for each of the plurality of threads, performing the analysis and configuring the processing circuitry is executed in each of a plurality of iterations. Configuring a processing circuitry associated with the thread's preferred memory area to execute the thread increases performance of the system's memory and thus increasing system's performance Collecting the plurality of thread statistical values while executing the plurality of threads increases accuracy of identifying the preferred memory area for the thread, increasing performance of the system's memory and thus increasing system's performance Repeating in a plurality of iterations collecting of the plurality of thread statistical values, performing the analysis, and configuring the processing circuitry, allows to compensate for changes in a thread's memory access patterns over time, and reduces a possible deterioration in the performance of the system's memory as the thread accesses more than one memory area over time.

Optionally, the present disclosure proposes identifying more than one thread of the plurality of threads that accesses the preferred memory area. Optionally, the present disclosure proposes configuring at least one of the one or more processing circuitries associated with the preferred memory area to execute the more than one thread. Executing more than one thread that share a preferred memory area on at least one processing circuitry associated with the preferred memory area further increases the performance of the system's memory.

In addition, in some embodiments the present disclosure proposes migrating at least some application data from one memory area of the plurality of memory areas to another memory area of the plurality of memory areas, optionally in response to performing the analysis. Optionally, the other memory area is the preferred memory area of the thread. Migrating application data from one memory area to another memory area allows improving performance of one or more new memory accesses performed by the thread.

In computer programming, a compute kernel (also known as a computational kernel) is a set of instructions that is separate from, but used by, a main set of instructions of a software program. It is common practice to compile a compute kernel for execution by an accelerator executing in parallel to a main processing circuitry executing the software program, for example by a graphics processing unit (GPU). According to some embodiments described herewithin, the plurality of threads each execute part of a compute kernel of a software program. Optionally, the compute kernel comprises a plurality of loop iterations for accessing application data of the software program, and each of the plurality of threads executes some of the plurality of loop iterations. In such embodiments, the present disclosure proposes identifying the preferred memory area by an analysis of a code of the plurality of threads, where the analysis of the code is to identify the compute kernel and additionally or alternatively to identify the application data. In such embodiments, identifying the preferred memory area by the analysis of the code is additionally, or alternatively, to identifying the preferred memory by performing the analysis of the plurality of thread statistical values. Analysis of the code to identify the compute kernel may be done using one or more static analysis methods, optionally before executing the plurality of threads. Optionally, performing the analysis of the plurality of thread statistical values is immediately before executing the compute kernel, i.e. after executing an instruction immediately preceding the compute kernel and before executing a first instruction of the compute kernel. Performing the analysis of the plurality of statistical values according to identifying the compute kernel and immediately before executing the compute kernel increases accuracy of identifying the respective preferred memory area for each of the plurality of threads, thus increasing the performance of the system's memory.

A state of a thread comprises one or more register values of a thread at an identified time, where a register value is a value of a register of a processing circuitry when executing the thread. Additionally, or alternatively, a state of a thread comprises a plurality of stack values of a stack memory of the thread. Further additionally, or alternatively, a state of a thread comprises one or more permission values identifying one or more permissions to access one or more computing resources of the system. Optionally, the plurality of thread statistical values comprises a state of the thread. Optionally, the processing circuitry that is configured to execute the thread is selected according to the state of the thread. For example, when the thread comprises code that accesses an array, the processing circuitry that is configured to execute the thread may be selected according to one or more register values that identify a base location in memory of the array and additionally or alternatively one or more additional register values that identify one or more offsets in the array that are accessed by the thread.

Before explaining at least one embodiment in detail, it is to be understood that embodiments are not necessarily limited in its application to the details of construction and the arrangement of the components and/or methods set forth in the following description and/or illustrated in the drawings and/or the Examples Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, at least one hardware processor 101 is connected to a plurality of processing circuitries, for example comprising processing circuitry 110A, processing circuitry 110B, processing circuitry 110C, and processing circuitry 110D, collectively referred to as plurality of processing circuitries 110. Some examples of a processing circuitry include a central processing unit (CPU), a core of a multi-core processing unit (CPU core), a data processing unit (DPU), a graphics processing unit (GPU), a microcontroller unit (MCU), a neural-network accelerator, a quantum computer, an intelligence processing unit (IPU), and an accelerated processing unit (ACU). Some other examples of a processing circuitry include a field-programmable gate array (FPGA), a coarse-grained reconfigurable architecture (CGRA), and an application-specific integrated circuit (ASIC). Optionally, at least one of the plurality of processing circuitries 110 is integrated in the at least one hardware processor 101.

For brevity, henceforth the term "processing unit" is used to mean at least one hardware processor, and the terms are used interchangeably. Optionally, the processing unit 101 is connected to one or more reconfigurable interconnected computing grids 140, each comprising a plurality of reconfigurable logical elements connected by a plurality of reconfigurable data routing junctions. An example of a reconfigurable logical element is processing circuitry that may be configured to perform one of an identified set of mathematical and logical operations. Some examples of a mathematical operation are addition and subtraction. Some examples of a logical operation are a logical NOT operation and a logical AND operation. Optionally, the plurality of reconfigurable logical elements is organized in a plurality of groups of logical elements, each comprising some of the plurality of logical elements connected by some of the plurality of configurable data routing junctions. Optionally, one or more of the plurality of processing circuitries 110 is part of the one or more interconnected computing grids 140, comprising one or more of the plurality of groups of logical elements. Optionally, the one or more interconnected computing grids 140 are members of the plurality of processing circuitries 110.

Optionally, system 100 comprises a plurality of memory areas comprising memory area 120A, memory area 120B, memory area 120C, memory area 120D, memory area 120E, memory area 120F, memory area 120G, memory area 120H, and memory area 120I, collectively referred to as plurality of memory areas 120. Optionally, at least one of the plurality of memory areas 120 is a memory component electrically coupled with at least one of the plurality of processing circuitries 110, for example the memory area 120B may be electrically coupled with the processing circuitry 110B. Optionally, the plurality of memory areas 120 comprises at least one cache memory of another memory component, for example the memory area 120E may be a cache memory component of the memory area 120F connected thereto. Optionally, the memory area 120E is electrically coupled with one or more of the plurality of processing circuitries 110, for example the processing circuitry 110C.

Optionally, at least one of the plurality of memory areas 120 is a memory component connected to at least one of the plurality of processing circuitries 110 via a bus, for example the memory area 120D may be connected to the processing circuitry 110D via a bus. Optionally, at least one of the plurality of memory areas 120, for example the memory area 120G is connected to at least one of the plurality of processing circuitries 110, for example the processing circuitry 110D, via at least one digital communication network interface 130. Some examples of a digital communication network are a local area network (LAN), for example an Ethernet network or a Wi-Fi network, and a wide area network (WAN), for example the Internet. Optionally, at least one of the plurality of memory areas 120 is connected indirectly to at least one of the plurality of processing circuitries. For example, the at least one memory area may be connected to the at least one processing circuitry via another of the plurality of memory areas 120, for example the memory area 120F is connected to the processing circuitry 110C via the memory area 120E. Optionally, the at least one memory area is connected to the at least one processing circuitry via another component of the system 100.

Optionally, the reconfigurable computing grid 140 comprises a reconfigurable interconnected memory grid. Optionally, at least part of the reconfigurable interconnected memory grid is one or more of the plurality of memory areas, for example the memory area 120H and additionally or alternatively the memory area 120I.

Optionally, the plurality of memory areas 120 is connected to the plurality of processing circuitries 110. Optionally, each of the plurality of memory areas 120 is connected to one or more of the plurality of processing circuitries 110. A processing circuitry of the plurality of processing circuitries 110 may be connected to more than one of the plurality of memory areas 120, for example the processing circuitry 110A is connected to the memory area 120A and the memory area 120C. A memory area of the plurality of memory areas 120 may be connected to more than one of the plurality of processing circuitries 110, for example the memory area 120A is connected to the processing circuitry 110A and the processing circuitry 110C.

Optionally, each of the plurality of memory areas 120 is associated with one or more of the plurality of processing circuitries 110 according to one or more memory access metrics. For example, the memory area 120B may be associated with the processing circuitry 110B according to a topological distance therebetween, for example when the memory area 120B is physically closer to the processing circuitry 110B than any other of the plurality of memory areas 120 is close to the processing circuitry 110B. A topological distance between a memory area and a processing circuitry may be a distance on an integrated circuit board implementing at least part of system 100. When one or more of the plurality of memory areas 120 are memory areas in the reconfigurable computing grid 140, a topological distance is optionally a distance in a routing grid therein. Some other examples of a memory access metric include, but are not limited to, access latency of a memory area, throughput of a memory area, memory capacity of a memory area, and memory coherence between the plurality of memory areas 120 when accessed by a plurality of threads of a software program executed by the plurality of processing circuitries 110. Another example of a memory access metric is ownership of memory allocation to the memory area, which determines an administrative manager that allocates memory in the memory area. Optionally, ownership of memory allocation is an administrative allocation. Optionally, one or more of the plurality of memory areas 120 are associated with one or more of the plurality of processing circuitries 110 according to a cache memory usage policy. An example of a cache memory usage policy is a policy that dictates evicting a cache entry after one use. Other examples of a cache memory usage policy define other criteria for evicting a cache entry based on access to the cache entry. Some other examples of a cache memory usage policy include policies of eviction or population of a cache entry according to an address in a memory area and additionally or alternatively according to a property of a memory management unit, for example a memory page that is marked for no caching or for not-being evicted (a sticky page). Optionally a cache memory usage policy is associated with a Quality of Service policy of executing a plurality of threads. Optionally, a cache usage policy distributes a plurality of memory access operations to a memory area of the plurality of memory areas among one or more cache memory areas of the plurality of memory areas to reduce the load on each of the one or more cache memory areas, and additionally or alternatively to facilitate caching more of the memory area simultaneously and thus allowing for a faster completion of the plurality of memory access operations that when only one cache memory area is associated with the memory area.

Optionally, one or more of the plurality of memory areas 120 are associated with one or more of the plurality of processing circuitries 110 according to one or more cache utilization metrics, for example such that cache utilization is increased, for example to increase cache evacuation population metrics.

Optionally, at least one processing circuitry of the plurality of processing circuitries 110 comprises telemetry circuitry for the purpose of collecting a plurality of thread statistical values when executing the plurality of threads. The telemetry circuitry may be associated with one or more of the plurality of memory areas 120. Optionally, the telemetry circuitry is implemented in one or more memory controller components connected to one or more of the plurality of memory areas 120 (not shown).

To execute a plurality of software threads, in some embodiments described herewithin system 100 implements the following optional method. Reference is now made also to FIG. 2, showing a flowchart schematically representing an optional flow of operations 200, according to some embodiments.

In such embodiments, in 201 the processing circuitry 110 collects for each software thread of one or more of the plurality of software threads a plurality of thread statistical values that are indicative of a plurality of memory accesses to at least some of the memory areas 120 while executing the thread. Some examples of a thread statistical value include a latency of a memory access and a throughput of a memory area. Some other examples of a thread statistical value include, but are not limited to, an amount of memory accesses to a memory area by a thread of the plurality of software threads, an amount of memory accesses to a memory area by a subset of the plurality of software threads, an amount of cache misses, and an amount of translation lookaside buffer misses. An access counter counting an amount of memory accesses to a memory area may count only read memory accesses, only write memory accesses, or a total of memory accesses of any type. An access counter may be associated with one of the plurality of software threads or may be associated with more than one of the plurality of software threads. Optionally, a memory access counter is associated with all the plurality of software threads. Optionally, the plurality of thread statistical values comprises a state of the thread, i.e. one or more register values of one or more registers of a processing circuitry while executing the thread.

Optionally, the processing unit 201 collects the plurality of thread statistical values while the plurality of threads are executed, optionally by the processing unit 101 and additionally or alternatively by one or more of the plurality of processing circuitries 110. Optionally, the thread comprises a plurality of telemetry computer instructions, for the purpose of collecting the plurality of thread statistical values. Optionally, the plurality of telemetry computer instructions are added to a code of the plurality of threads by processing the code, for example when compiling the code of the plurality of threads. When at least one of the plurality of processing circuitries 110 comprises telemetry circuitry for the purpose of collecting the plurality of thread statistical values, the processing unit 101 optionally collects at least a subset of the plurality of thread statistical values using the telemetry circuitry.

In 210, the processing unit 101 performs for one or more threads of the plurality of software threads an analysis comprising the plurality of thread statistical values of the one or more threads, optionally to identify in 220 a preferred memory area of the plurality of memory areas 120. For example, the processing unit 101 may identify that the memory area 120A is the preferred memory area, for example when the analysis indicates that the memory area 120A has a low access latency when accessed by the one or more threads. Optionally, the preferred memory area contains program data used by the one or more threads. Optionally, performing the analysis in 210 comprises identifying that the preferred memory area contains program data used by the one or more threads. Optionally, identifying the preferred memory area for the one or more threads additionally depends on additional memory accesses performed by additional threads that are not the one or more threads, for example for the purpose of balancing between the requirements of the plurality of threads. Performing the analysis in 210 optionally comprises using one or more other pluralities of thread statistical values of one or more other threads of the plurality of software threads. Optionally, performing the analysis in 210 further comprises using a plurality of control-flow statistical values collected while executing the plurality of software threads. A control-flow statistical value may be indicative of one or more branch selections while executing the plurality of threads. Another example of a control flow statistical value is an instruction identifier.

Optionally, performing the analysis in 210 comprises using one or more state values of a state of the one or more threads, where the one or more state values are at least part of the plurality of thread statistical values of the one or more threads collected while executing the plurality of threads. Some examples of a state value are a register value of a register of a processing circuitry, and a stack value of a stack memory of a thread. For example, when the one or more threads comprise code that accesses an array, the preferred memory area may be selected according to one or more register values that identify a base location in memory of the array and additionally or alternatively one or more additional register values that identify one or more offsets in the array that are accessed by the thread.

In 230, the processing unit 101 optionally configures one of the one or more processing circuitries associated with the preferred memory area to execute the one or more threads. For example, when the preferred memory area is the memory area 120A, in 230 the processing unit 101 may configure the processing circuitry 110A, associated with the memory area 120A, to execute the one or more threads. Optionally, configuring the processing circuitry to execute the one or more threads comprises translating the one or more threads into one or more dataflow graphs and projecting the one or more dataflow graphs onto the reconfigurable computation grid 140, i.e. configuring at least some of the plurality of logical elements of the reconfigurable computation grid 140 to execute the one or more dataflow graphs.

Figure 3:
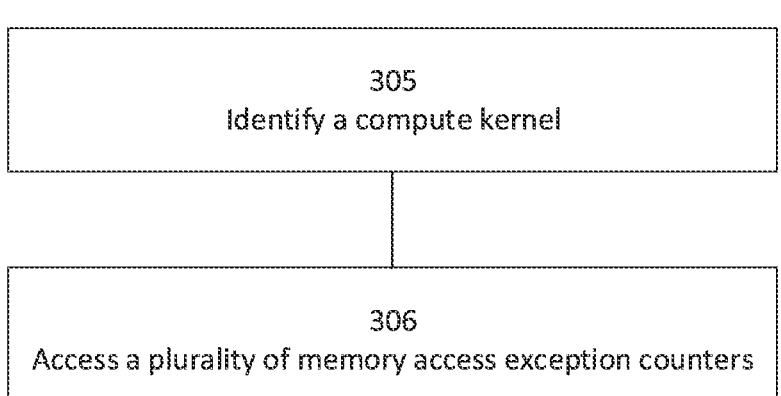
FIG. 3 is a flowchart schematically representing an optional flow of operations for analysis, according to some embodiments.

In some embodiments, performing the analysis in 210 comprises using additional information. Reference is now made also to FIG. 3, showing a flowchart schematically representing an optional flow of operations 300 for analysis, according to some embodiments. Optionally, each of the plurality of threads executes part of a compute kernel of a software program. Optionally, the compute kernel comprises a plurality of loop iterations for accessing application data of the software program. Optionally, each of the plurality of threads executes some of the plurality of loop iterations, accessing at least some of the application data by executing the some of the plurality of loop iterations. Optionally, in 305 the processing unit 101 performs another analysis of a code of the plurality of software threads to identify the compute kernel. Optionally, in 305 the processing unit 101 identifies more than one compute kernel such that the plurality of software threads each execute part of one of the more than one compute kernel. Additionally, or alternatively, in 305 the processing unit 101 identifies the application data according to the other analysis. Optionally, the processing unit 101 performs the other analysis using one or more static code analysis methods, optionally before executing the plurality of threads. For example, the processing unit 101 may identify according to the other analysis, before executing the plurality of threads, in each of the plurality of threads one or more memory accesses for accessing application data of the software program. Optionally, performing the analysis in 210 comprises additionally performing the other analysis in 305. Optionally, performing the other analysis in 305 is alternatively to performing the analysis using the plurality of thread statistical values.

Optionally, the processing unit 101 executes 201, and thus executes 305, immediately before executing the compute kernel, i.e. after executing an instruction immediately preceding the compute kernel and before executing a first instruction of the compute kernel.

Optionally, in 306 the processing unit 101 accessing a plurality of memory access exception counters. Optionally, each of the plurality of memory access exception counters is associated with one or more of the plurality of threads and is indicative of an amount of memory exceptions occurring when executing the one or more threads associated with the memory exception counter. Optionally, a memory access exception counter is associated with one of the plurality of software threads. Optionally, performing the analysis in 210 further comprises using the plurality of memory access exception counters.

Reference is now made also to FIG. 4, showing a flowchart schematically representing an optional flow of operations 400 for analysis using exception counters, according to some embodiments. Optionally, the processing unit 101 executes method 200 in each of a plurality of iterations. Optionally, at least one of the plurality of iterations is executed in response to a hardware exception handled by software, for example a memory page fault, a split transaction comprising a plurality of instructions or a slow-path atomic instruction. Optionally, at least some of the plurality of iterations are executed periodically at an identified time interval. Optionally, at least some of the plurality of iterations are executed periodically according to an amount of executed operations, for example periodically according to an amount of program iterations of the software program.

Optionally, the processing unit 101 configures the processing circuitry 110A to execute the one or more threads in an identified iteration of the plurality of iterations. Optionally, in another iteration of the plurality of iterations, in 401 the processing unit 101 identifies, for the one or more threads, that a memory access exception counter associated therewith exceeds an exception threshold value. In 405, the processing unit 101 optionally identifies a new preferred memory area of the plurality of memory areas 120, for example the memory area 120D. Optionally, in 407, the processing unit 101 configures one of at least one processing circuitries associated with the new preferred memory area to execute the one or more threads. For example, in 407 the processing unit 101 may configure the processing circuitry 110D, associated with the memory area 120D, to execute the one or more threads instead of the processing circuitry 110A.

In some systems there exists a single common page table for managing the plurality of memory areas such that each of the plurality of processing circuitries 110 has a copy of the single common page table. Optionally, one or more of the plurality of processing circuitries 110 has a copy of the single common page table adapted for an architecture of the one or more processing circuitries. It is common practice for an exception counter to be associated with a processing circuitry. In such systems where an exception counter is associated with a processing circuitry, an exception counter will not distinguish between memory accesses to more than one memory area of the plurality of memory areas 120 and the exception counter counts memory access exceptions to any of the plurality of memory areas 120.

In some embodiments described herewithin, system 100 comprises a plurality of page tables, such that at least one of the plurality of processing circuitries 110 has one or more page tables of the plurality of page tables not shared with another of the plurality of processing circuitries 110, for example the processing circuitry 110A may have a first page table not shared with the processing circuitry 110B, and the processing circuitry 110B may have a second page table not shared with the processing circuitry 110A. Optionally, each of the plurality of page tables maps memory according to an identified set of memory attributes, for example mapping memory addresses to a memory area associated with the processing circuitry having the page table. In this example the first page table maps memory area 120A and memory area 120C but not memory area 120B, and the second page table maps memory area 120B and not memory area 120A or memory area 120C. Another example of mapping according to a memory attribute is mapping according to a memory access attribute, for example one page table maps read accesses whereas another page table maps write accesses. In another example, one page table maps cached memory and another page table maps non-cached memory.

In a system comprising a plurality of page tables, mapping memory according to the set of identified memory attributes facilitates counting different types of accesses separately. For example, in the example above when the processing circuitry 110A accesses the memory area 120B there will always be a page fault since the first page table of the processing circuitry 110A does not map the memory area 120B, allowing to distinguish an amount of page faults caused by remote memory access and an amount of page faults caused by local memory management. Similarly, when memory is mapped to a page table according to one or more memory access attributes, an exception counter associated with the page table may count one or more memory accesses not having the one or more memory access attributes, for example write operations to memory mapped for read-only accesses.

Optionally, the processing unit 101 generates a plurality of page tables, each according to one of a plurality of identified sets of memory attributes such that at least one of the plurality of statistical counters is associated with one of the plurality of page tables and not with another of the plurality of page tables. In an example embodiment, the processing unit 101 generates a first page table for a first processing circuitry, for example the processing circuitry 110A, according to a first set of memory attributes, for example mapping only the memory area 120A and the memory area 120C. In this example, the processing unit 101 generates a second page table for a second processing circuitry, for example the processing circuitry 110B, according to a second set of memory attributes, for example mapping only the memory area 120B. Optionally, at least a first statistical value of the plurality of thread statistical values is collected according to at least one exception when accessing the first page table, for example when the processing circuitry 110A accesses the memory area 120B. Optionally, at least a second statistical value of the plurality of thread statistical values is collected according to at least one other exception when accessing the second page table, for example when the processing circuitry 110B accesses the memory area 120C. Optionally, processing circuitry generates the first page table and the second page table for the processing circuitry 110A. Optionally the first set of memory attributes is different from the second set of memory attributes, for example the first set of memory attributes comprises read accesses and the second set of memory attributes comprises write accesses.

Reference is now made again to FIG. 2. In some embodiments, more than one threads share the preferred memory area and there may be an advantage to executing these more than one threads by the one or more processing circuitries associated with the preferred memory area. Optionally, in 240, the processing unit 101 identifies more than one thread of the plurality of threads accessing the preferred memory area. Optionally, in 241 the processing unit 101 configures at least some of the one or more processing circuitries associated with the preferred memory areas to execute the more than one thread. For example, when the preferred memory area is the memory area 120A, and the memory area 120A is associated with the processing circuitry 110A and the processing circuitry 110C, in 241 the processing unit 101 may configure one or more of the processing circuitry 110A and the processing circuitry 110C to execute the more than one threads.

Optionally, in response to performing the analysis in 210, in 250 the processing unit 101 migrates at least some application data from one memory area of the plurality of memory areas 120 to another memory area of the plurality of memory areas, for example from the memory area 120F to the memory area 120H. Optionally, the other memory area is the preferred memory area, in our example the memory area 120A. Optionally, at least one additional thread of the plurality of threads accesses the at least some application data. In 251, the processing unit 101 optionally configures the processing circuitry 110A, associated with the preferred memory area 120A, to execute the at least one additional thread. Thus, in an iteration of the plurality of iterations, the processing unit 101 may migrate one or more threads between the plurality of processing circuitries 110 according to program data migrated to a preferred memory area identified for one of the plurality of threads.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processing circuitries will be developed and the scope of the term processing circuitry is intended to include all such new technologies a priori.

As used herein the term "about" refers to 10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for executing a plurality of software threads, comprising:
   a plurality of processing circuitries;
   a plurality of memory areas connected to the plurality of processing circuitries, each memory area associated with at least one of the plurality of processing circuitries; and
   at least one hardware processor, connected to the plurality of processing circuitries and configured for:
      in each of a plurality of iterations:
         while the plurality of processing circuitries executes the plurality of software threads, collecting, for each software thread of one or more of the plurality of software threads, a plurality of thread statistical values indicative of a plurality of memory accesses to at least some of the plurality of memory areas performed when executing the software thread;
         for at least one software thread of the one or more software threads, performing an analysis, comprising the plurality of thread statistical values thereof and using at least one statistical value of the plurality of thread statistical values collected for the at least one software thread, where a statistical value is a state value of the at least one software thread, to identify a preferred memory area of the plurality of memory areas; and
         configuring one of the at least one processing circuitry associated with the preferred memory area to execute the at least one software thread, wherein the one of the at least one processing circuitry associated with the preferred memory area is selected according to the at least one state value of the at least one software thread.

2. The system of claim 1, wherein the plurality of processing circuitries comprises at least one of: a central processing unit (CPU), a core of a multi-core processing unit (CPU core), a data processing unit (DPU), a graphics processing unit (GPU), a microcontroller unit (MCU), an accelerated processing unit (APU), a field-programmable gate array (FPGA), a coarse-grained reconfigurable architecture (CGRA), a neural-network accelerator, an intelligence processing unit (IPU), an application-specific integrated circuit (ASIC), a quantum computer, a reconfigurable interconnected computing grid, comprising a plurality of reconfigurable logical elements connected by a plurality of reconfigurable data routing junctions, and part of a reconfigurable interconnected computing grid.

3. The system of claim 1, wherein at least one of the plurality of processing circuitries is integrated into the at least one hardware processor.

4. The system of claim 1, wherein the plurality of memory areas comprises at least one of:
   a memory component electrically coupled with at least one of the plurality of processing circuitries;
   a cache memory of another memory component connected to at least one other of the plurality of processing circuitries, where the cache memory is electrically coupled with the at least one other processing circuitry;
   yet another memory component connected to at least one other of the processing circuitries via a bus or at least one digital communication network interface; and at least part of a reconfigurable interconnected memory grid that is part of a reconfigurable interconnected computing grid.

5. The system of claim 1, wherein each of the plurality of memory areas is associated with the at least one of the plurality of processing circuitries according to at least one memory access metric.

6. The system of claim 5, wherein the at least one memory metric comprises at least one of the group of memory metrics consisting of: access latency, throughput, a cache utilization metric, memory capacity, topological distance, memory allocation ownership, and memory coherence.

7. The system of claim 1, wherein the preferred memory area contains program data used by the at least one software thread; and
   wherein performing the analysis comprising the plurality of thread statistical values of the at least one software thread further comprises identifying that the preferred memory area contains program data used by the at least one software thread.

8. The system of claim 1, wherein the at least one hardware processor is further configured for:
   identifying more than one software thread of the plurality of software threads accessing the preferred memory area; and
   configuring at least some of the at least one processing circuitry associated with the preferred memory areas to execute the more than one software thread.

9. The system of claim 1, wherein performing the analysis comprising the plurality of thread statistical values of the at least one software thread further comprises using at least one other plurality of thread statistical values of at least one other thread of the one or more software threads.

10. The system of claim 1, wherein the at least one hardware processor is further configured for migrating at least some application data from one memory area of the plurality of memory areas to another memory area of the plurality of memory areas in response to performing the analysis.

11. The system of claim 10, wherein the at least some application data is accessed by at least one additional thread of the plurality of software threads;
   wherein the other memory area is the preferred memory area; and
   wherein the at least one hardware processor is further configured for configuring the at least one processing circuitry associated with the preferred memory area to execute the at least one additional thread.

12. The system of claim 1, wherein the plurality of software threads each execute part of a compute kernel of a software program, where the compute kernel comprises a plurality of loop iterations for accessing application data of the software program such that each of the plurality of software threads executes some of the plurality of loop iterations, accessing at least some of the application data thereby; and
   wherein the at least one hardware processor is further configured for identifying the preferred memory area by additionally or alternatively performing another analysis of a code of the plurality of software threads to identify the compute kernel and additionally or alternatively to identify the application data.

13. The system of claim 1, wherein the at least one software thread comprises a plurality of telemetry computer instructions for the purpose of collecting the plurality of thread statistical values.

14. The system of claim 1, wherein at least one of the plurality of processing circuitries comprises telemetry circuitry for the purpose of collecting the plurality of thread statistical values.

15. The system of claim 1, wherein the at least one hardware processor is further configured for:

accessing a plurality of memory access exception counters, each associated with at least one additional software thread of the plurality of software threads and indicative of an amount of memory exceptions when executing the additional software thread associated therewith; and performing the analysis further comprising using the plurality of memory access exception counters.

16. The system of claim 15, wherein the at least one hardware processor configures the one of the at least one processing circuitry associated with the preferred memory area in an identified iteration of the plurality of iterations; and wherein the at least one hardware processor is further configured for, in another iteration of the plurality of iterations executed after the identified iteration:

identifying for the at least one software thread that the memory access exception counter associated therewith exceeds an exception threshold value;

identifying a new preferred memory area of the plurality of memory areas; and configuring one of the at least one processing circuitry associated with the other preferred memory area to execute the at least one software thread.

17. The system of claim 1, wherein the plurality of thread statistical values comprises at least one of: a latency of a memory access, a throughput of a memory area, an amount of memory accesses to a memory area, an amount of memory accesses to a memory area by a thread of the plurality of software threads, an amount of memory accesses to a memory area by a subset of the plurality of software threads, an amount of cache misses, and an amount of translation lookaside buffer misses.

18. The system of claim 1, wherein the at least one hardware processor is further configured for:

generating for a first processing circuitry of the plurality of processing circuitries a first page table for mapping at least a first subset of the plurality of memory areas according to a first set of memory attributes; and generating for a second processing circuitry of the plurality of processing circuitries a second page table for mapping at least a second subset of the plurality of memory areas according to a second set of memory attributes;

wherein at least a first statistical value of the plurality of thread statistical values is collected according to at least one exception when accessing the first page table; and wherein at least a second statistical value of the plurality of thread statistical values is collected according to at least one other exception when accessing the second page table.

19. The system of claim 18, wherein the first processing circuitry is the second processing circuitry.

20. A system for executing a plurality of software threads, comprising:

a plurality of processing circuitries;

a plurality of memory areas connected to the plurality of processing circuitries, each memory area associated with at least one of the plurality of processing circuitries; and at least one hardware processor, connected to the plurality of processing circuitries and configured for:

in each of a plurality of iterations:

while the plurality of processing circuitries executes the plurality of software threads, collecting, for each software thread of one or more of the plurality of software threads, a plurality of thread statistical values indicative of a plurality of memory accesses to at least some of the plurality of memory areas performed when executing the software thread;

for at least one software thread of the one or more software threads, performing an analysis, comprising the plurality of thread statistical values thereof; and configuring one of the at least one processing circuitry associated with the preferred memory area to execute the at least one software thread;

wherein the plurality of software threads each execute part of a compute kernel of a software program, where the compute kernel comprises a plurality of loop iterations for accessing application data of the software program such that each of the plurality of software threads executes some of the plurality of loop iterations, accessing at least some of the application data thereby;

wherein the at least one hardware processor is further configured for identifying the preferred memory area by additionally or alternatively performing another analysis of a code of the plurality of software threads to identify the compute kernel and additionally or alternatively to identify the application data; and wherein performing the analysis is after executing an instruction immediately preceding the compute kernel and before executing a first instruction of the compute kernel.

21. A method for executing a plurality of software threads, comprising:

in each of a plurality of iterations:

while a plurality of processing circuitries executes the plurality of software threads, collecting, for each software thread of one or more of the plurality of software threads, a plurality of thread statistical values indicative of a plurality of memory accesses to at least some of a plurality of memory areas performed when executing the software thread, where the plurality of memory areas are connected to the plurality of processing circuitries, each memory area associated with at least one of the plurality of processing circuitries;

for at least one software thread of the one or more software threads, performing an analysis, comprising the plurality of thread statistical values thereof and using at least one statistical value of the plurality of thread statistical values collected for the at least one software thread, where a statistical value is a state value of the at least one software thread, to identify a preferred memory area of the plurality of memory areas; and configuring one of the at least one processing circuitry associated with the preferred memory area to execute the at least one software thread, wherein the one of the at least one processing circuitry associated with the preferred memory area is selected according to the at least one state value of the at least one software thread.

22. A software program product for executing a plurality of software threads, comprising:

a non-transitory computer readable storage medium; and program instructions for in each of a plurality of iterations:

while a plurality of processing circuitries executes the plurality of software threads, collecting for each software thread of one or more of the plurality of software threads a plurality of thread statistical values indicative of a plurality of memory accesses to at least some of a plurality of memory areas performed when executing the software thread, where the plurality of memory areas are connected to the plurality of processing circuitries, each memory area associated with at least one of the plurality of processing circuitries;

for at least one software thread of the one or more software threads, performing an analysis, comprising the plurality of thread statistical values thereof and using at least one statistical value of the plurality of thread statistical values collected for the at least one software thread, where a statistical value is a state value of the at least one software thread, to identify a preferred memory area of the plurality of memory areas; and configuring one of the at least one processing circuitry associated with the preferred memory area to execute the at least one software thread, wherein the one of the at least one processing circuitry associated with the preferred memory area is selected according to the at least one state value of the at least one software thread;

wherein the program instructions are executed by at least one computerized processor from the non-transitory computer readable storage medium.

23. The system of claim 1, wherein performing the analysis further comprises using a plurality of control-flow statistical values collected while executing the plurality of software threads.

* * * * *